United States Patent
Scherer

(10) Patent No.: US 7,681,384 B2
(45) Date of Patent: Mar. 23, 2010

(54) APPARATUS FOR PROCESSING CROP MATERIALS IN A FORAGE HARVESTER

(76) Inventor: Bob A. Scherer, 3219 S. Tyler Ave., Sioux Falls, SD (US) 57103

(*) Notice: Subject to any disclaimer, the term of this patent is extended or adjusted under 35 U.S.C. 154(b) by 742 days.

(21) Appl. No.: 10/833,802

(22) Filed: Apr. 28, 2004

(65) Prior Publication Data

US 2004/0261388 A1      Dec. 30, 2004

Related U.S. Application Data

(60) Provisional application No. 60/482,594, filed on Jun. 25, 2003.

(51) Int. Cl.
*A01D 61/00* (2006.01)
(52) U.S. Cl. .................. 56/16.4 R; 56/16.4 B
(58) Field of Classification Search ............. 56/16.4 R, 56/16.4 B, 16.5, 16.4 A, 14.1
See application file for complete search history.

(56) References Cited

U.S. PATENT DOCUMENTS

| | | | |
|---|---|---|---|
| 5,269,124 A * | 12/1993 | Barthel et al. | 56/16.4 B |
| 5,498,207 A * | 3/1996 | Cappon et al. | 460/119 |
| 6,220,007 B1 * | 4/2001 | Doerr et al. | 56/16.4 C |
| 6,510,679 B2 * | 1/2003 | Krone et al. | 56/62 |
| 6,604,352 B1 * | 8/2003 | Tyvaert et al. | 56/16.4 B |
| 6,711,996 B1 * | 3/2004 | Mackie | 100/169 |

OTHER PUBLICATIONS

Claas Self propelled forage harvester.

* cited by examiner

*Primary Examiner*—Alicia M Torres
(74) *Attorney, Agent, or Firm*—Jeffrey A. Proehl; Woods, Fuller, Shultz & Smith, PC

(57) ABSTRACT

An apparatus is disclosed for processing crop materials in a forage harvester. The apparatus may comprise a pair of rotatable rollers for cutting crop materials passed between the rollers, and a bifurcated frame supporting the rollers in a proximate condition to each other. The bifurcated frame includes a first frame portion and a second frame portion, with a first one of the rollers being mounted on the first frame portion for moving with the first portion and a second one of the rollers being mounted on the second frame portion. The first frame portion may be movable with respect to the second frame portion to move the first roller laterally away from the second roller.

21 Claims, 4 Drawing Sheets

APPARATUS FOR PROCESSING CROP MATERIALS IN A FORAGE HARVESTER

REFERENCE TO RELATED APPLICATION

The present utility patent application claims the benefit of the provisional patent application filed in the United States Patent and Trademark Office on Jun. 25, 2003 and assigned the application No. 60/482,594.

BACKGROUND OF THE INVENTION

1. Field of the Invention

The present invention relates to crop processing equipment and more particularly pertains to a new apparatus for processing crop materials in a forage harvester that has a structure that minimizes the downtime of the forage harvester due to maintenance reasons.

2. Description of the Prior Art

The use of crop processing equipment is known in the prior art. Apparatus such as forage harvesters, such as the Jaguar self-propelled forage harvester available from the Claas of America Corporation of Columbus, Ind., include several stages of the crop material processing for shredding and chopping crop material, such as silage, into a size and condition that is suitable for use as feed for animals.

One later (and often final) stage of the crop material processing includes passing the crop material through a narrow gap between two substantially cylindrical rollers of a roller assembly. At least one, and typically both, of the rollers have teeth that function to shred and chop the crop material into pieces suitably small enough for feed. Commonly the rollers are rotating at very fast, but different, speeds to cause the shredding of the crop materials passing through the gap between the rollers and to propel the crop material along the desired path.

The roller assemblies, including structures for supporting the rollers are known. The nature of the roller assemblies, and the environment that they operate in, requires periodic removal of the roller assemblies from the forage harvester for replacement or at least re-grooving to reform the teeth. However, the support structures that have also been employed to mount the rollers in the forage harvesters have made the practice of removing and maintaining the rollers unnecessarily difficult, and also the known structures have been thought to have been undersized and insufficiently rugged, causing jamming of the crop material in the roller assembly and breakdowns that take the forage harvester out of operation during harvest time.

For example, the removal of the rollers from the support structure, which must occur when the rollers are to be replaced, typically requires movement of each of the rollers through a portion of the frame of the mounting structure, and the subsequent reinsertion of a replacement roller through the frame. This complicates the replacement process and prolongs the amount of time that the roller structure, and thus the crop processing equipment, is taken out of service.

Another significant limitation of known roller assemblies is the narrowing of the path of the crop materials through the assemblies, which can lead to increased incidences of clogging of the roller assembly. Typically, guides are employed at the lateral sides of the path to move the crop material inward toward the centers of the rollers, but this movement tends to encourage clogging of the path.

Other limitations of the known roller structures are undersized rollers, bearings, greasing systems, and shaft diameters, which also contribute to unnecessary breakdowns of the roller assemblies that can make the crop processing equipment more unreliable than they could be.

In these respects, the apparatus for processing crop materials, according to the present invention, substantially departs from the conventional concepts and designs of the prior art, and in so doing provides an apparatus highly effective for minimizing the downtime of the forage harvester due to maintenance reasons.

SUMMARY OF THE INVENTION

In view of the foregoing disadvantages inherent in the known types of crop processing equipment now present in the prior art, the present invention provides a new apparatus for processing crop materials in a forage harvester wherein the same minimizes the downtime of the forage harvester due to maintenance reasons.

To attain this, the present invention generally comprises an apparatus for processing crop materials in a forage harvester. The apparatus may comprise a pair of rotatable rollers for cutting crop materials passed between the rollers, and a bifurcated frame supporting the rollers in a proximate condition to each other. The bifurcated frame includes a first frame portion and a second frame portion, with a first one of the rollers being mounted on the first frame portion for moving with the first portion and a second one of the rollers being mounted on the second frame portion. The first frame portion may be movable with respect to the second frame portion to move the first roller laterally away from the second roller.

In embodiments of the invention, the first frame portion is mounted to the second frame portion in a manner permitting pivot movement of the first frame portion away from the second frame portion, and the first frame portion is movable between a closed position and an open position. In some embodiments of the invention, the closed position is characterized by the first and second rollers being in close proximity to each other, and the open position being characterized by the first and second rollers being in remote relationship to each other.

Other improvements of the invention include employing relatively larger diameter rollers so that the rotational speed of the rollers may be reduced relative to previous crop processing equipment employing relatively smaller diameter rollers, and employing relatively longer rollers so that the path of the crop materials moving through the processing equipment does not have to be narrowed at the lateral edges of the path.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the capability to open the frame and remove the rollers from their mountings on the frame without having to move the rollers through small or restricted openings in the frame, which would make the roller replacement process more difficult and time consuming to perform.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
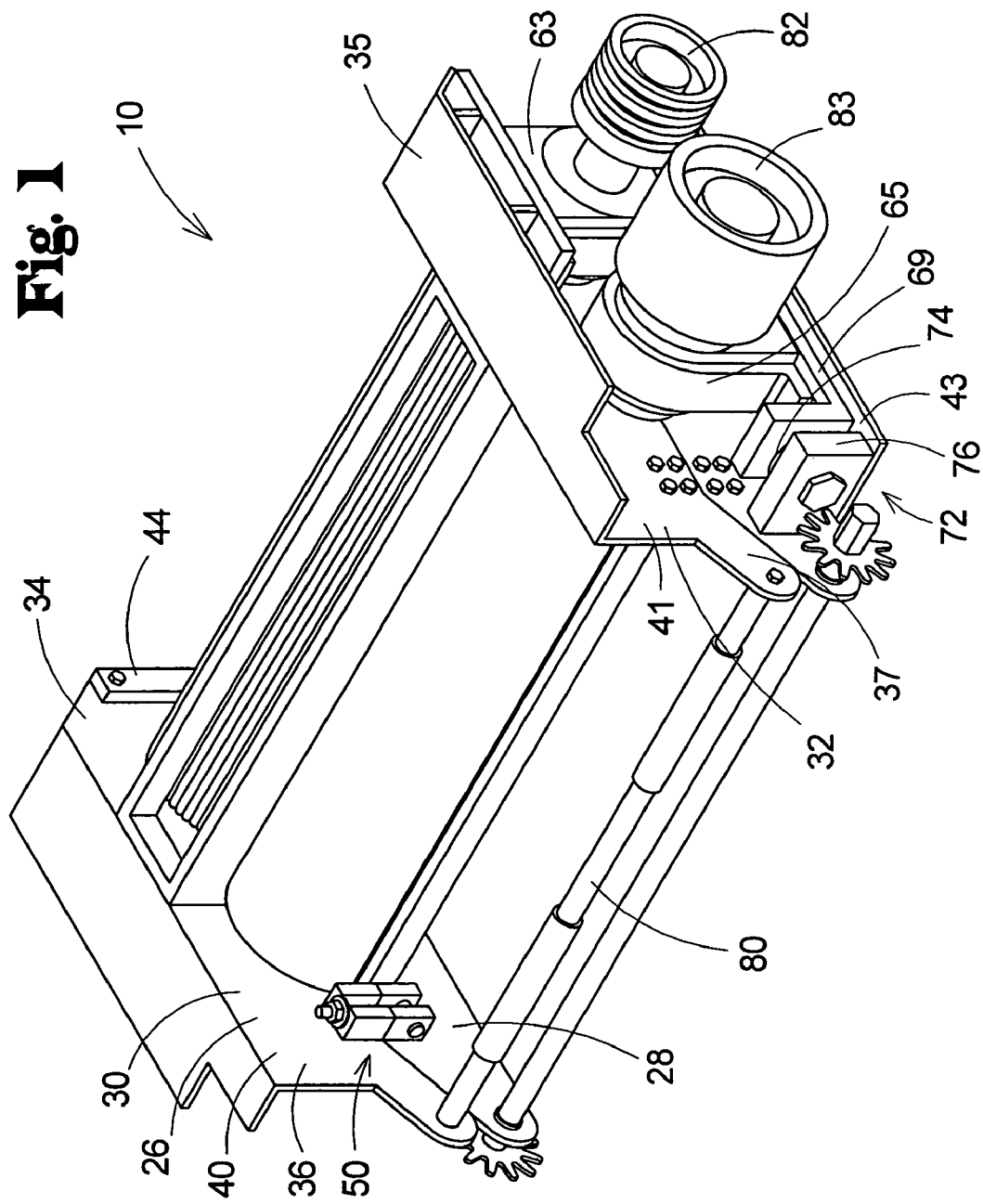
FIG. 1 is a schematic upper right side perspective view of a new apparatus for processing crop materials in a forage harvester according to the present invention in the closed position.
Figure 2:
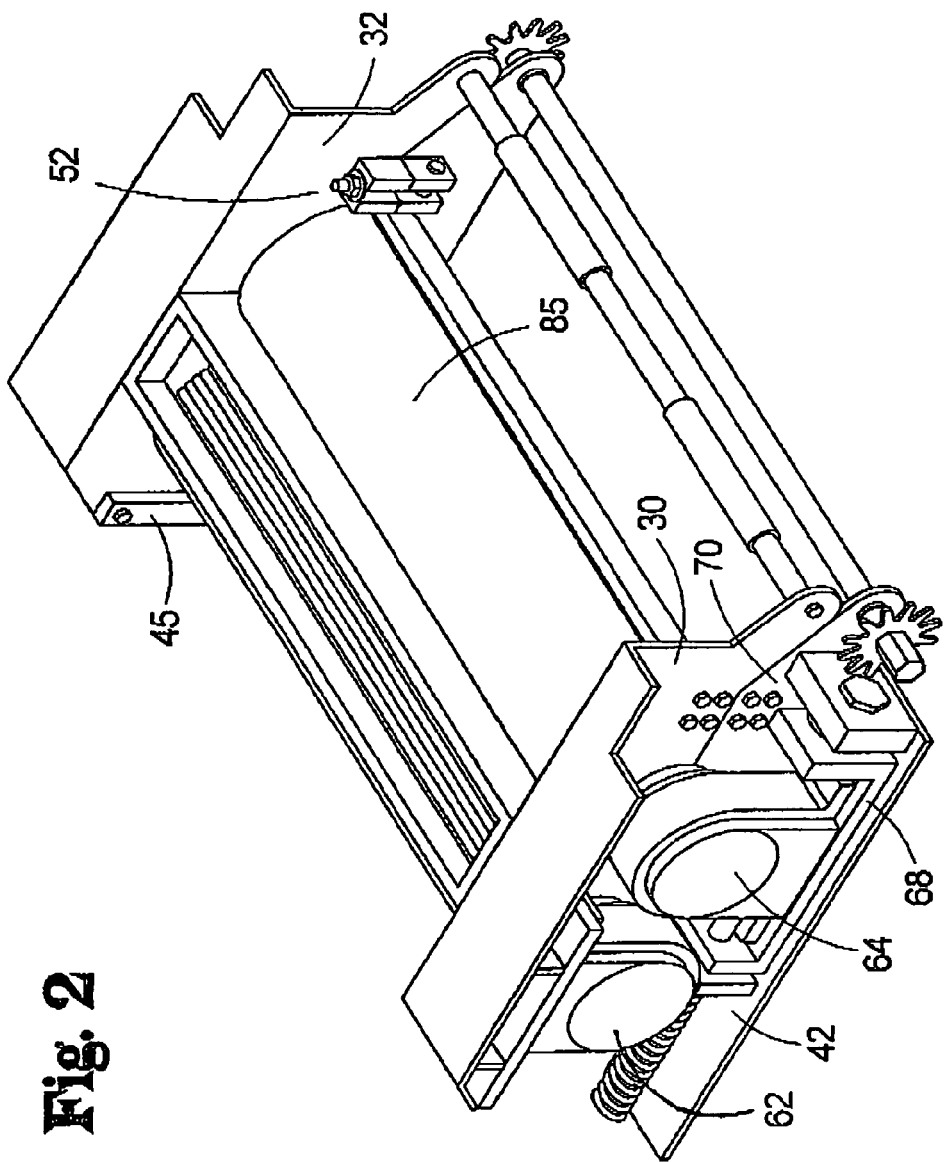
FIG. 2 is a schematic upper left side perspective view of the present invention in the closed position.

With reference now to the drawings, and in particular to FIGS. 1 through 4 thereof, a new apparatus embodying the principles and concepts of the present invention and generally designated by the reference numeral 10 will be described.

The invention contemplates an apparatus 10 that is highly suitable for processing crop materials, such as silage, in a forage harvester apparatus, although other applications of the novel concepts of the invention may be implemented. In general, the apparatus 10 includes a pair of rollers 12, 14 for cutting crop materials therebetween, and a frame 24 for supporting the rollers in a proximate condition to each other that permits the rollers 12, 14 to be moved apart from each other to facilitate maintenance of the rollers.

Figure 3:
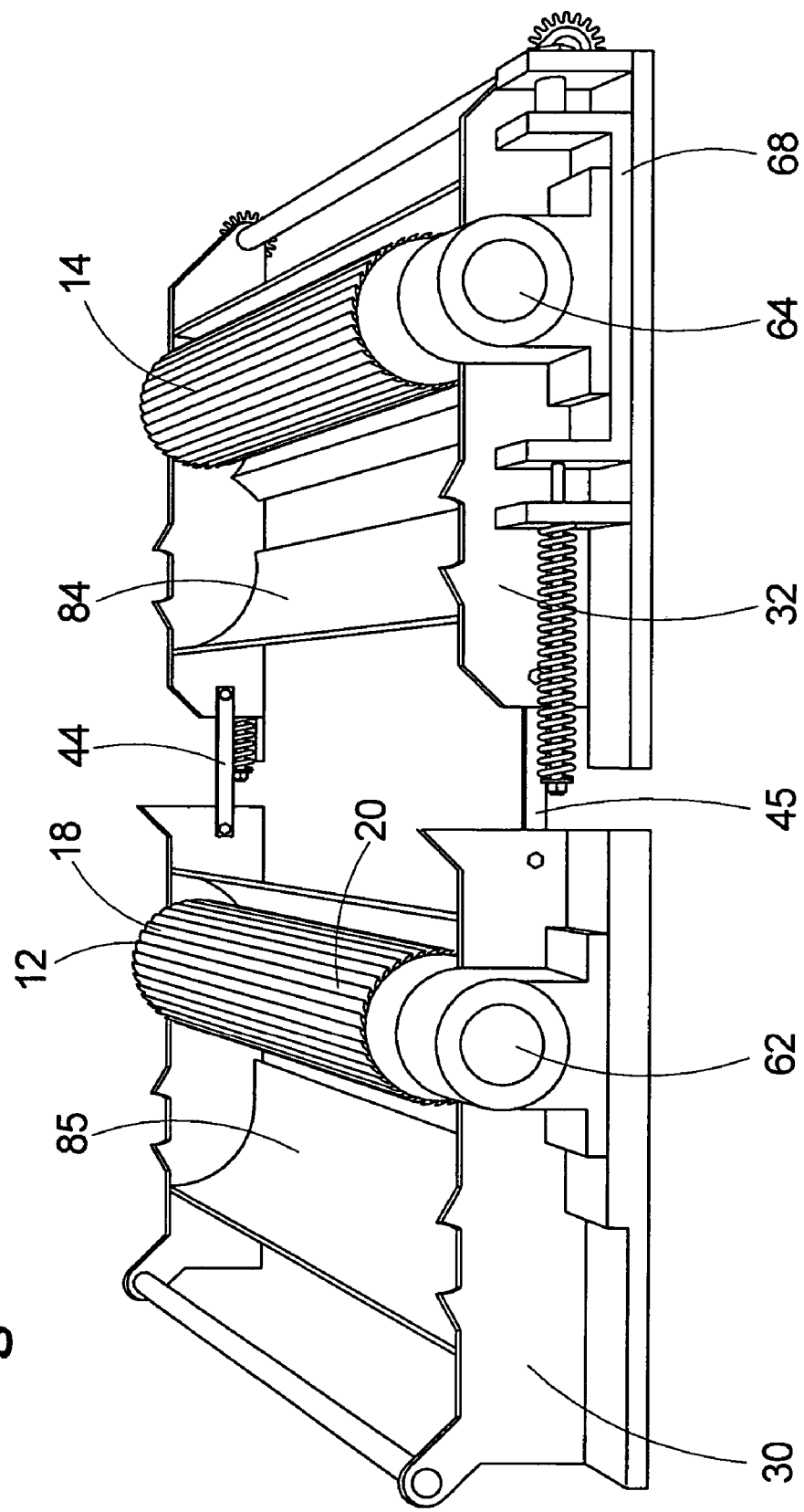
FIG. 3 is a schematic side perspective view of the present invention in the open position.
Figure 4:
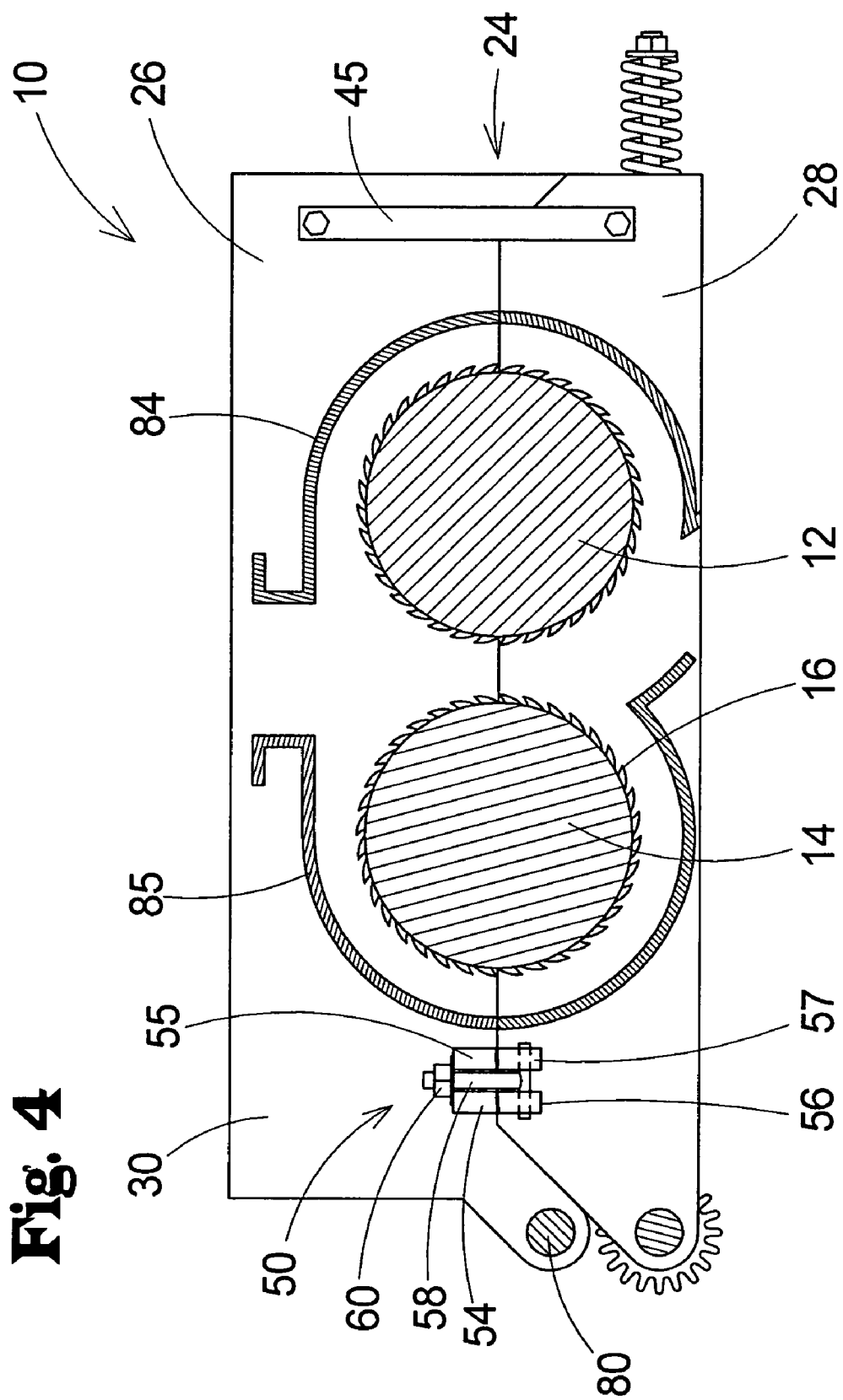
FIG. 4 is a schematic sectional view of the present invention in the closed position.

In greater detail, as shown in FIGS. 3 and 4, each of the pair of rollers 12, 14 may be substantially cylindrical in shape. Each of the rollers 12, 14 may have an exterior that is covered with teeth 16, and each of the teeth may extend from a first end 18 of the roller to a second end 20 of the roller. In one embodiment of the invention, each of the teeth 16 has a saw tooth profile, although other tooth profiles may be employed.

The frame 24 may generally be adapted for installation on a forage harvester, and in at least one embodiment is one may be adapted to be used on a Jaguar model forage harvester made by the Claas of America Corporation of Columbus, Ind., although adaptations to other brands of forage harvesters may be possible.

In a significant aspect of the invention, the frame 24 is bifurcated or divided into a first frame portion 26 and a second frame portion 28. A first one 12 of the rollers may be mounted on the first frame portion 26 and a second one 14 of the rollers may be mounted on the second frame portion 28. Significantly, the invention has the capability to move the first frame portion 26 with respect to the second frame portion 28 to cause the first roller 12 to move laterally away from the second roller 14. In one embodiment of the invention, the first frame portion 26 may be mounted to the second frame portion 28 in a manner that permits pivot movement of the first frame portion 26 away from the second frame portion 28 to thereby substantially and significantly increase a physical distance between the first roller 12 and the second roller 14. To attain this, the first frame portion 26 may be pivotally mounted on the second frame portion 28, and the first frame portion 26 may be movable between a closed position (see, for example, FIG. 1) and an open position (see, for example, FIG. 3).

The closed position may be characterized by the first 12 and second 14 rollers being in relatively close but spaced proximity to each other, and the open position may be characterized by the first 12 and second 14 rollers being in a relatively remote relationship to each other, with a spacing between the rollers 12, 14 being increased by at least five times the spacing in the closed position. The closed position may be characterized by the first 26 and second 28 frame portions being in close proximity to each other, and optionally being abutted against each other. The open position may be characterized by the first 26 and second 28 frame portions being spaced from each other, and optionally being rotated away from each other. The first 24 and second 28 frame portions may be positioned in substantially parallel (but separate and spaced) planes in the closed position, and the first 24 and second 28 frame portions may be positioned in the same (or substantially the same) plane in the open position.

In at least one embodiment of the invention, movement of the first frame portion 26 from the closed position to the open position inverts the first frame portion 26. The first frame portion 26 may interlock with the second frame portion 28 when the frame portions are in the closed position. The first frame portion 26 may be positioned above the second frame portion 28 when the frame portions are in the closed position. Optionally, the first 12 and second 14 rollers are trapped against removal from the frame 24 when the first 26 and second 28 frame portions are in the closed position, and the rollers 12, 14 may be trapped between the frame portions 26, 28. In the open position, the rollers 12, 14 may be lifted or raised out of the frame portions 26, 28 without moving the rollers through the frame portions.

In greater detail, the first frame portion 26 and the second frame portion 28 may each comprise a pair of side frame members 30, 32. The pair of side frame members 30, 32 of each frame portion 26, 28 may be positioned in opposition to each other on opposite ends of the first and second rollers 12, 14. Each of the side frame members 30, 32 may have an inboard end 34, 35 and an outboard end 36, 37. The respective inboard ends 34, 35 of the side frame members 30, 32 may be positioned adjacent to each other and the respective outboard ends 36, 37 of the frame members 30, 32 may be positioned adjacent to each other in the closed position. Each of the side frame members 30, 32 may have an inward wall 40, 41 that lies generally in a plane oriented substantially perpendicular to rotational axes of the rollers. Each of the side frame members 30, 32 may have a lateral wall 42, 43 that is attached to, and extends substantially perpendicularly to, the inward wall 40, 41 of the associated one of the side frame members. The disclosed structure for the side frame members is highly suitable for mounting the rollers on the frame, although other configurations for the side frame members may optionally be employed.

The invention may also include means for connecting the first frame portion 26 to the second frame portion 28 in a manner that permits movement of the first frame portion with respect to the second frame portion. In one embodiment of the invention, the connecting means comprises at least one bar 44 that extends between the first frame portion 26 and the second frame portion 28, and preferably includes a pair of the bars 44, 45 that extend between the first and second frame portions. The bars 44, 45 extend between the inboard ends 34, 35 of the side frame members of the first and second frame portions 26, 28. The bars 44, 45 form a simple, yet effective structure for permitting pivot or swing movement of the first frame portion 26 with respect to the second frame portion 28, although other structures may be employed for connecting the first and second frame portions.

The invention may also include means for selectively securing the first 26 and second 28 frame portions in the closed position and against movement into the open position. The securing means may be mounted on the first frame portion 26 and the second frame portion 28 for extending between the frame portions to secure the first frame portion 26 against the second frame portion 28 in the closed position. In one embodiment of the invention, the securing means comprises a pair of securing assemblies 50, 52 on the frame portions 26, 28. Each of the securing assemblies 50, 52 may be mounted on the outboard ends 36, 37 of the side frame members of the first and second frame portions 30, 32. In one embodiment of the invention, each of the securing assemblies 50, 52 comprises a pair of ears 54, 55 mounted on one side frame member 30 of the first frame portion 26 and a pair of ears 56, 57 mounted on a corresponding side frame member of the second frame portion 28. In one embodiment of the invention, an eyebolt 58 is positioned between the ears 54, 55, 56, 57, and a pin is extended through the eye of the eyebolt 58 with its ends mounted on the pair of ears 56, 57. The eyebolt 58 is thus able to pivot with respect to one pair 56, 57 of ears so as to be swivelable with respect to the ears to permit movement of a base portion of the eyebolt 58 into a position between the ears 54, 55 of the other pair of ears. The base portion of the eyebolt 58 may be threaded, and a nut 60 may be mounted on the threaded portion of the eyebolt 58 so that the nut 60 may be abutted against the other pair of ears 54, 55, and the nut 60 may be rotated and tightened on the threaded portion of the eyebolt 58 to cause or force the pairs of ears 54, 55, 56, 57 toward each other to thereby hold the first and second frame portions in the closed position.

A pair of bearing assemblies may be provided for mounting each of the rollers 12, 14 to a respective one of the frame portions 26, 28. Each bearing assembly may comprise a pair of bearings that are located at opposite ends of the roller 12, 14. A first bearing assembly may mount the first roller 12 on the first frame portion 26, and a second bearing assembly may mount the second roller 14 on the second frame portion 28. Illustratively, the first bearing assembly comprises a pair of first bearings 62, 63 that are located at opposite ends of the first roller 12, and each of the first bearings may be mounted on the side frame members of the first frame portion 26. Similarly, the second bearing assembly may comprise a pair of second bearings 64, 65 that are located at opposite ends of the second roller 14, and each of the second bearings 64, 65 may be mounted on the side frame members of the second frame portion 28.

Optionally, and preferably, a position of the first bearing assembly may be substantially fixed with respect to the first frame portion 26 and a position of the second bearing assembly may be adjustable with respect to the second frame portion 28 to permit adjustment of a gap that exists between the first 12 and second 14 rollers. The invention may thus include means for adjusting the position of the second roller 14 with respect to the first roller 12 when the frame portions 26, 28 are in the closed position. The position adjustment means may act on the second bearings 64, 65 of the second bearing assembly, and the position adjustment means may be positioned between the second bearings 64, 65 and the second frame portion 28. In one embodiment of the invention, the position adjustment means comprises a sled 68, 69 that is mounted between each one of the second bearings 64, 65 and a corresponding one of the side frame members of the second frame portion 28. The position adjustment means may also comprise a pair of screw assemblies 70, 72 that each act upon one of the sleds 68, 69 on which the second bearings are mounted. Illustratively each of the screw assemblies may include a screw 74, or threaded rod, mounted between a fixed block 76 fixedly mounted on the second frame portion 28 and the sled 68. The screw 74 may extend through a threaded aperture in the fixed block 76 and extend engage the sled 68 so that rotation of the screw 74 adjusts the extension of the screw with respect to the block 76, and thereby affects the relative spacing between the fixed block 76 and the sled, thus affecting the position of the sled 68 (and the second roller 14 mounted thereon) with respect to the fixed block 76 and the first roller 12. Optionally, the sleds 68, 69 may be spring-biased into the desired position to permit the rollers 12, 14 to move slightly apart and widen the gap, so as to accommodate the movement of objects such as rocks between the rollers.

A handle 80 may also be provided for facilitating lifting of the first frame portion 26 in an upward direction with respect to the second frame portion 28. The handle 80 may be mounted on the first frame portion 26. In one embodiment of the invention, the handle 80 extends between the outboard ends 36, 37 of the side frame members 30, 31 of the first frame portion 26.

The invention may also include a pair of pulleys 82, 83 for transmitting rotational motion to the first 12 and second 14 rollers, respectively. The pair of pulleys 82, 83 may comprise a first pulley 82 mounted on an end of the first roller 12 and a second pulley 83 mounted on an end of the second roller 14. These pulleys 82, 83 may receive a drive belt (not shown) of the forage harvester drive system A pair of shields 84, 85 may be mounted on each of the first 26 and second 28 frame portions, and each of the shields 84, 85 may be positioned adjacent to one of the first 12 and second 14 rollers for deflecting or guiding movement of crop material or silage through the apparatus 10.

In some embodiments of the invention, the ends 18, 20 of the first rollers 12 and the ends of the second roller 14 are each positioned closely adjacent to the respective frame members 30, 32 of the frame portions 26, 28 of the frame 24. This relationship permits the path of the crop materials moving between the rollers 12, 14 to remain as wide as possible through the apparatus 10, without significant narrowing of the lateral sides of the path through the apparatus 10. Since the path is not significantly narrowed through the apparatus, the likelihood of the apparatus becoming clogged with crop materials is significantly reduced since the materials are not forced to pass through a narrower, and thus smaller, area when the materials encounter the rollers 12, 14. The rollers 12, 14 may also have a relatively larger cross sectional diameter as compared to previous apparatus to thereby reduce roller rotation speed while maintaining similar surface speeds on the rollers.

In use, the frame 24 may be removed from the forage harvester and the securing assemblies 50, 52 may be released so as to permit movement of the outboard ends of the frame portions 26, 28 away from each other. The handle 80 may be used to lift the outboard end of the first frame portion 26 away from the second frame portion 28, and the first frame portion may be rotated or pivoted with respect to the second frame portion to move the first frame portion from a position above the second frame portion (e.g., in the closed position) to a position adjacent to the second frame portion (e.g., in the open position). While the frame 24 is in the open position, the first 12 and second 14 rollers may be raised or lifted upwardly out of the frame, such as by releasing the first roller bearings 62, 63 from the first frame portion 26 and releasing the second roller bearings 64, 65 from the second frame portion 28. Once the rollers 12, 14 have been replaced on the frame portions 26, 28, the first frame portion 26 may be pivoted back into the closed position above the second frame portion 28, and the securing assemblies 50, 52 may be re-secured. The frame 24 may then be reinstalled into the forage harvester.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for processing crop materials in a forage harvester, comprising:
   a pair of rotatable rollers for cutting crop materials passed between the rollers; and
   a bifurcated frame supporting the rollers in a proximate condition to each other, the bifurcated frame including a first frame portion and a second frame portion, a first one of the rollers being mounted on the first frame portion for moving with the first frame portion and a second one of the rollers being mounted on the second frame portion, the first frame portion being movable with respect to the second frame portion to move the first roller laterally away from the second roller;
   wherein each roller of the pair of rollers has an exterior with a plurality of teeth formed on the exterior, the plurality of teeth being configured to cut crop materials passing between the pair of rollers.

2. The apparatus of claim 1 wherein the first frame portion is mounted to the second frame portion in a manner permitting pivot movement of the first frame portion away from the second frame portion.

3. The apparatus of claim 2 wherein the first frame portion is pivotally mounted on the second frame portion.

4. The apparatus of claim 1 wherein the first frame portion is movable between a closed position and an open position.

5. The apparatus of claim 4 wherein the closed position is characterized by the first and second rollers being in close proximity to each other and the open position being characterized by the first and second rollers being in remote relationship to each other.

6. The apparatus of claim 4 wherein the closed position is characterized by the first and second portions of the frame being abutted against each other and the open position being characterized by the first and second portions of the frame being spaced from each other.

7. The apparatus of claim 4 wherein the first and second portions of the frame are positioned in substantially parallel planes in the closed position and the first and second portions of the frame are positioned in the same plane in the open position.

8. The apparatus of claim 4 wherein movement of the first frame portion from the closed position to the open position inverts the first frame portion.

9. The apparatus of claim 4 wherein the first frame portion releasably interlocks with the second frame portion in the closed position.

10. The apparatus of claim 4 wherein the first frame portion is positioned above the second frame portion when the frame portions are in the closed position.

11. The apparatus of claim 4 wherein the first and second rollers are trapped against removal from the frame when the first and second frame portions are in the closed position.

12. The apparatus of claim 4 additionally comprising connecting means for connecting the first frame portion to the second frame portion in a manner permitting movement of the first portion with respect to the second portion.

13. The apparatus of claim 12 wherein the connecting means comprises at least one bar extending between the first frame portion and the second frame portion.

14. The apparatus of claim 4 additionally comprising securing means for selectively securing the first and second frame portions in the closed position.

15. The apparatus of claim 1 additionally comprising a handle mounted on the first frame portion for lifting the first frame portion in an upward direction with respect to the second frame portion.

16. The apparatus of claim 1 wherein each of the frame portions comprises a pair of frame members, and wherein each of the rollers has a pair of opposite ends, and each of the ends of the rollers being positioned closely adjacent to one of the frame members.

17. The apparatus of claim 1 wherein the first frame portion is mounted to the second frame portion in a manner permitting pivot movement of the first frame portion away from the second frame portion;
   wherein the first frame portion is pivotally mounted on the second frame portion;
   wherein the first frame portion is movable between a closed position and an open position;
   wherein the closed position is characterized by the first and second rollers being in close proximity to each other and the open position being characterized by the first and second rollers being in remote relationship to each other;
   wherein the closed position is characterized by the first and second portions of the frame being abutted against each other and the open position being characterized by the first and second portions of the frame being spaced from each other;
   wherein the first and second portions of the frame are positioned in substantially parallel planes in the closed position and the first and second portions of the frame are positioned in the same plane in the open position;
   wherein movement of the first frame portion from the closed position to the open position inverts the first frame portion;
   wherein the first frame portion releasably interlocks with the second frame portion in the closed position;

wherein the first frame portion is positioned above the second frame portion when the frame portions are in the closed position;

wherein the first and second rollers are trapped against removal from the frame when the first and second frame portions are in the closed position;

connecting means for connecting the first frame portion to the second frame portion in a manner permitting movement of the first portion with respect to the second portion;

wherein the connecting means comprises at least one bar extending between the first frame portion and the second frame portion;

securing means for selectively securing the first and second frame portions in the closed position;

a handle mounted on the first frame portion for lifting the first frame portion in an upward direction with respect to the second frame portion;

wherein at least one tooth of the plurality of teeth on both of the rollers has a substantially straight edge extending from a first end of the roller to a second, opposite end of the roller; and wherein the teeth formed on the exterior of at least one roller of the pair of rollers has a saw-tooth profile in a plane oriented transverse to an axis about which the rollers are rotatable; and wherein substantially an entirety of the exterior of each of the rollers is covered with the plurality of teeth.

18. The apparatus of claim 1 wherein at least one tooth of the plurality of teeth on both of the rollers has a substantially straight edge extending from a first end of the roller to a second, opposite end of the roller.

19. The apparatus of claim 18 wherein the teeth formed on the exterior of at least one roller of the pair of rollers has a saw-tooth profile in a plane oriented transverse to an axis about which the rollers are rotatable.

20. A processor unit for removably positioning in a forage harvester for processing crop materials passing through the forage harvester, the processor comprising:

a pair of rotatable rollers for cutting crop materials passed between the rollers, each roller of the pair of rollers having a plurality of teeth being capable of shredding crop materials passing between the pair of rollers when the rollers are rotated; and a bifurcated frame supporting the rollers in a proximate condition to each other, the bifurcated frame including a first frame portion and a second frame portion, a first one of the rollers being mounted on the first frame portion for moving with the first frame portion and a second one of the rollers being mounted on the second frame portion, the first frame portion being movable with respect to the second frame portion to move the first roller laterally away from the second roller;

wherein each roller of the pair of rotatable rollers has an exterior, a plurality of teeth being formed on the exterior of the rollers capable of cutting crop materials passing between the pair of rollers, and wherein at least one tooth of the plurality of teeth on each of the rollers has a substantially straight edge extending from a first end of the roller to a second, opposite end of the roller.

21. The apparatus of claim 1 wherein substantially an entirety of the exterior of each of the rollers is covered with the plurality of teeth.

* * * * *